(12) United States Patent
Hoffland et al.

(10) Patent No.: US 11,634,349 B2
(45) Date of Patent: Apr. 25, 2023

(54) TWO-STAGE BIOGAS PRODUCTION SYSTEM FOR ANAEROBIC DIGESTERS

(71) Applicants: Robert O. Hoffland, Montgomery, TX (US); Prince N. Dugba, Magnolia, NC (US)

(72) Inventors: Robert O. Hoffland, Montgomery, TX (US); Prince N. Dugba, Magnolia, NC (US)

( * ) Notice: Subject to any disclaimer, the term of this patent is extended or adjusted under 35 U.S.C. 154(b) by 90 days.

(21) Appl. No.: 17/203,974

(22) Filed: Mar. 17, 2021

(65) Prior Publication Data

US 2021/0292203 A1 Sep. 23, 2021

Related U.S. Application Data

(60) Provisional application No. 62/990,780, filed on Mar. 17, 2020.

(51) Int. Cl.
*C02F 9/00* (2006.01)
*B01D 53/14* (2006.01)
(Continued)

(52) U.S. Cl.
CPC ............ *C02F 9/00* (2013.01); *B01D 53/1493* (2013.01); *B01D 53/229* (2013.01); *C10L 3/10* (2013.01); *C10L 3/101* (2013.01); *B01D 53/1475* (2013.01); *B01D 2053/223* (2013.01); *B01D 2252/103* (2013.01); *B01D 2256/245* (2013.01); *B01D 2257/502* (2013.01);
(Continued)

(58) Field of Classification Search
CPC .. C02F 9/00; C02F 1/20; C02F 3/2806; C02F 3/303; C02F 3/305; C02F 3/307; C02F 3/34; C02F 11/04; C02F 2103/20; C02F 2303/10; B01D 53/1493; B01D 53/229; B01D 2053/223; B01D 2252/103; B01D 2258/05; B01D 53/1475; B01D 2256/245; B01D 2257/502; C10L 3/10; C10L 3/101; C10L 2290/06; C10L 2290/46; C10L 2290/541; C10L 2290/548; Y02C 20/20; Y02W 10/20; Y02W 10/30; Y02W 10/10
USPC .......... 210/603, 612, 175, 259, 903; 95/156, 95/214, 227

See application file for complete search history.

(56) References Cited

U.S. PATENT DOCUMENTS

5,884,466 A 3/1999 Kelly
7,008,535 B1 3/2006 Spears
(Continued)

*Primary Examiner* — Fred Prince
(74) *Attorney, Agent, or Firm* — McCutcheon Joseph, PLLC (57) ABSTRACT

A multi-stage system comprising a digester, a bioreactor, a scrubber, a biofilter, and a membrane filter extracts and purifies biogas from a wastewater feed. The digester separates raw biogas from wastewater, the wastewater is then purified with a three-stage bacterial process in a bioreactor. The scrubber receives raw biogas from the digester under pressure, dissolving waste gases and purifying the methane, which can be further condensed and purified in the membrane filter. The bioreactor receives waste gases from the scrubber and membrane filter, with the ammonia portion of the waste gases rising through water from the bioreactor and being converted by annamox bacteria into nitrogen gas. The multiply recycled gas and water feeds produce a biogas having high purity and reduced atmospheric emissions of waste gases.

20 Claims, 7 Drawing Sheets

(51) Int. Cl.
*B01D 53/22* (2006.01)
*C10L 3/10* (2006.01)
*C02F 11/04* (2006.01)
*C02F 3/28* (2006.01)
*C02F 3/30* (2006.01)
*C02F 1/20* (2006.01)
*C02F 3/34* (2006.01)
*C02F 103/20* (2006.01)

(52) U.S. Cl.
CPC ............ *B01D 2258/05* (2013.01); *C02F 1/20* (2013.01); *C02F 3/2806* (2013.01); *C02F 3/303* (2013.01); *C02F 3/305* (2013.01); *C02F 3/307* (2013.01); *C02F 3/34* (2013.01); *C02F 11/04* (2013.01); *C02F 2103/20* (2013.01); *C02F 2303/10* (2013.01); *C10L 2290/06* (2013.01); *C10L 2290/46* (2013.01); *C10L 2290/541* (2013.01); *C10L 2290/548* (2013.01); *Y02C 20/20* (2013.01); *Y02W 10/10* (2015.05); *Y02W 10/20* (2015.05); *Y02W 10/30* (2015.05)

(56) References Cited

U.S. PATENT DOCUMENTS

| | | | |
|---|---|---|---|
| 7,163,632 | B1 | 1/2007 | Speece |
| 8,188,283 | B2 | 5/2012 | Binch et al. |
| 2006/0060525 | A1* | 3/2006 | Hoffland ............ B01D 21/2405 210/603 |
| 2009/0206028 | A1* | 8/2009 | Jiang .................... C12M 47/18 210/603 |
| 2012/0228216 | A1 | 9/2012 | Gavrieli |
| 2014/0054217 | A1 | 2/2014 | Gusik |
| 2016/0023935 | A1* | 1/2016 | Josse ..................... C02F 3/302 210/601 |

* cited by examiner

TWO-STAGE BIOGAS PRODUCTION SYSTEM FOR ANAEROBIC DIGESTERS

REFERENCE

This is a non-provisional US patent application claiming priority to provisional U.S. application No. 62/990,780, filed on 17 Mar. 2020 with the same name and inventors. The full contents of the above-referenced application are incorporated herein by reference.

FIELD

This invention relates, generally, to an apparatus and method of converting animal and agricultural by-products into biogas, particularly the use of an integrated two-step physical and biological anammox system to upgrade the biogas to high-purity renewable natural gas (RNG) and reduce atmospheric pollution from agricultural operations.

BACKGROUND

Anaerobic digestion of animal and agricultural waste is an effective treatment system to reduce odor generation and recover energy. Most of the 250 million tons of dry animal manure generated yearly in the United States are produced by concentrated animal feeding operations (CAFOs). CAFOs typically use open anaerobic lagoons to digest the manure. Biogas containing methane from the lagoon is directly emitted into the atmosphere contributing significantly to greenhouse gas inventory. It is also estimated that about 90% of the nitrogen in the manure is also emitted into the atmosphere, which forms precursors for PM2.5 particulate pollutants in the atmosphere.

There is an increased effort to prevent direct emission of methane gas from agricultural operations by using anaerobic digesters (AD) in various design configurations. Existing open anaerobic lagoons can simply be covered with impermeable synthetic liners and/or install new enclosed anaerobic digesters to capture the biogas and convert it into renewable energy. Typically, the biogas contains about 50-70% methane ($CH_4$), 20-48% carbon dioxide ($CO_2$), 500-4,000 ppm hydrogen sulfide ($H_2S$), 200-3,000 ppm ammoniacal nitrogen, and trace amounts of mercaptans, hydrogen and other impurities. The biogas can be cleaned and upgraded into high-purity renewable natural gas (RNG) and used to supplement or eventually replace natural gas generated from fossil fuels.

Ammonia concentration levels in animal barns can increase to dangerous levels when wastewater from covered lagoons are recycled to flush and clean the animal houses. Removing ammonia from agricultural wastewater can therefore minimize health hazards associated with biological and agricultural operations.

Biological treatment systems to remove ammonia from wastewater such as nitrification and denitrification systems have high energy costs due to the requisite oxygen supply needed to oxidize the ammoniacal nitrogen into nitrate as intermediary compound before denitrification. The mechanical complexities and associated costs have made this technology unattractive for farming operations.

Other methods to recover ammoniacal nitrogen and convert it into ammonia sulfate fertilizer have been proposed requiring use of highly corrosive chemicals like hydrogen sulfide, and high degree of chemical safety training for farmers to operate the systems. Because modern agricultural production systems are highly concentrated in fewer and fewer locations, the ammonia sulfate and other nutrients recovered need to be converted into transportable forms for distribution and use. These additional processes have made adoption of marketable recovery systems difficult to adopt by farmers.

Another key purification requirement of biogas is removal of the $CO_2$. The most commonly used methods of removing $CO_2$ from biogas include pressurized water scrubbing, alkaline salt solution adsorption, amine absorption, physical solvent scrubbing using polyethylene glycol, biofilter, pressure swing adsorption, membrane separation, cryogenic distillation, supersonic separation and industrial lungs.

Current farming systems operate on thin economic margins that thus far have made it difficult to adopt these new technologies. New economic incentives for renewable energy mainly focus on reduction of greenhouse gas emissions. A need therefore exists for a treatment method which reduces the ammoniacal nitrogen of wastewater into elemental dinitrogen, while simultaneously reducing the $CO_2$ content of the produced gas, thus meeting the technological and economic challenge of converting the waste from agricultural operations into forms that can be transported and marketed.

Embodiments of the present invention, as described herein, meet these needs.

SUMMARY

In an embodiment, a novel biofiltration system using the anammox process is integrated into the biogas purification process, resulting in a system and method for converting ammoniacal nitrogen into dinitrogen using in-situ wastewater treatment systems at a significantly lower energy cost compared to traditional nitrification and denitrification. The $N_2$ produced from this process enters into the atmosphere, which is already made of about 78% of the gas.

In an embodiment, open anaerobic lagoons receiving waste from a CAFO are converted to covered lagoons or enclosed ADs. Biogas from the lagoons or ADs is cleaned and upgraded using a high-pressure wastewater scrubber followed by a membrane filter. In order to increase throughput of the membrane filter and reduce system cost, the biogas can be first cleaned with the high-pressure scrubber. Ammonia, removed from the biogas, can be blown into the uniquely designed anammox biofilter, which acts as a substrate to anaerobic bacteria which can further use nitrate from the partially aerated lagoon to produce the dinitrogen.

In an embodiment, the wastewater stream from the AD overflows into a bioreactor that can be partially aerated to convert some of the ammoniacal nitrogen into nitrate. Wastewater from the aerated portion of the bioreactor can be circulated into the non-aerated anaerobic and anoxic zones for denitrification and additional anammox reaction time, hence the name NAD (Nitrification, Anammox and Denitrification) bioreactor. When biogas is compressed, its temperature increases significantly. The AD wastewater can be circulated through a tubular heat exchanger to extract the heat energy from the compressed biogas thereby increasing solubilities of the constituent gasses (including $CO_2$) for scrubbing. Efficiency of the AD increases with the increased temperature. The purified biogas can be upgraded into renewable natural gas (RNG) and transported either through pipeline or mobile distribution systems Various embodiments of the disclosure are discussed in detail below. While specific implementations are discussed, it should be understood that this is done for illustration purposes only. A person skilled in the art will recognize that the other components and configurations may be used without departing from the scope of the disclosure.

DETAILED DESCRIPTION

Before describing selected embodiments of the present disclosure in detail, it is to be understood that the present invention is not limited to the embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
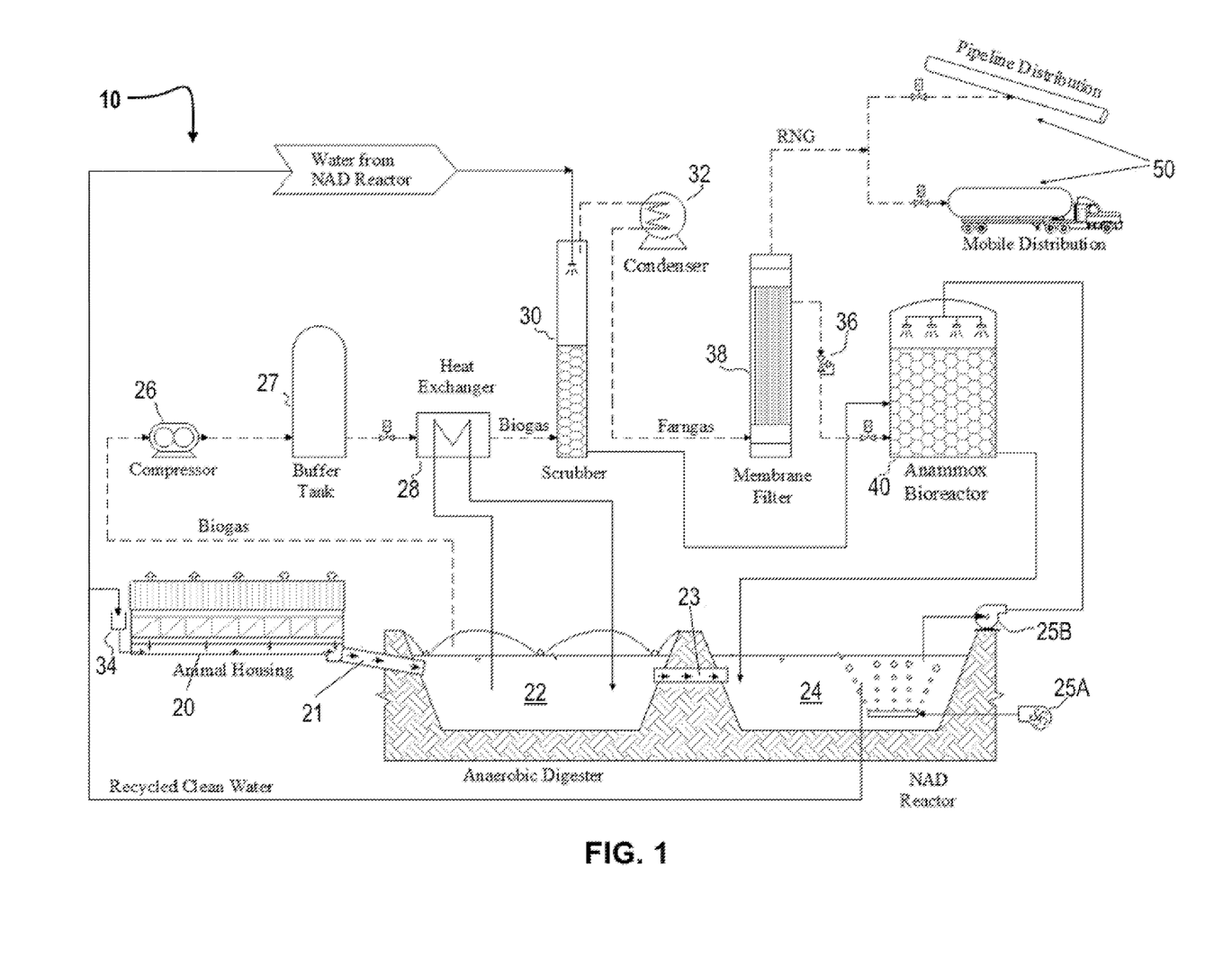
FIG. 1 depicts a flow chart showing the key operating units of an embodiment of the present system and method.

Turning first to FIG. 1, an embodiment of the integrated physical technology system 10 and the conversion of organic solids in wastewater is depicted in schematic form, including the generation of clean renewable natural gas (RNG), dinitrogen gas ($N_2$), and anti-pollution measures for noxious gases. The operating units of the system are plumbed together in an integrated design configuration where output from one unit becomes an input to the next unit, in series, using pumps and blowers for mass transfer. In FIG. 1, solid lines depict a mostly liquid conveyance while dotted lines depict mostly gas conveyance.

System raw material input can be, for example, manure wastewater generated from a livestock holding pen 20 (or any other suitable wastewater source) that is flushed into the Anaerobic Digester (AD) 22 via primary conduit 21. During the anaerobic digestion process, acidogenic bacteria enzymatically breaks down the long-chain organic molecules that make up the waste into shorter chain volatile fatty acids (VFA), which are then converted into raw biogas by methanogenic bacteria (e.g., Acetic Methanogens). The resulting raw biogas can be conveyed to a compressor 26 and stored in buffer tank 27 before being conveyed through a heat exchanger 28, where the gas is cooled by circulation of the liquid effluent before conveyance to scrubber 30. The digester is depicted in more detail in FIG. 2.

Figure 3:
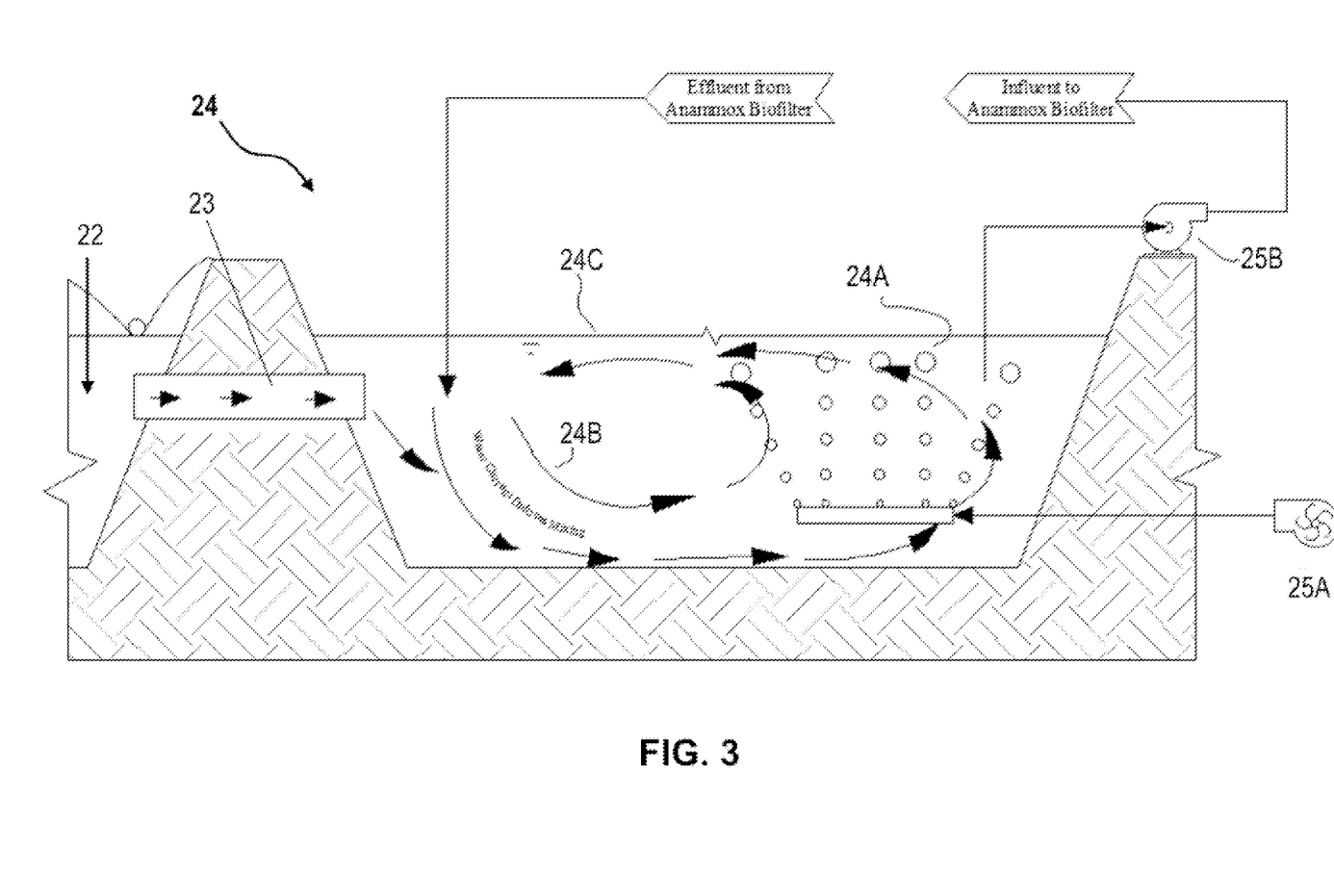
FIG. 3 depicts an exemplar NAD bioreactor for use with the present system and method.

The wastewater, now with reduced organic matter content, can then overflow into the NAD (Nitrification, Anammox and Denitritication) bioreactor 24, which is depicted in more detail in FIG. 3. The NAD reactor 24, depicted in more detail in FIG. 3, can generate partially nitrified water by means of a blower 25A and pump 25B which create a bubble column and a circulatory motion; the cycled fluid can then be circulated into the anammox filter 40, utilized in scrubbing operations in the scrubber 30, or recycled for washing the farm operations 20 via recycling conduit 34.

The scrubber 30 receives cooled biogas from the digester 22 at a temperature which results in a disproportionate amount of waste gases dissolving back into the water thereby increasing the purity of the remaining $CH_4$. The scrubbed water can return to the anammox filter 40 while the biogas is dried further as moisture is removed by condenser 32 and refined via a membrane filter 38, depicted in more detail in FIG. 6. Valve 36 controls the return of waste gases into the anammox filter 40 while the final gas is distributed via pipeline or mobile distribution methods 50.

Figure 2:
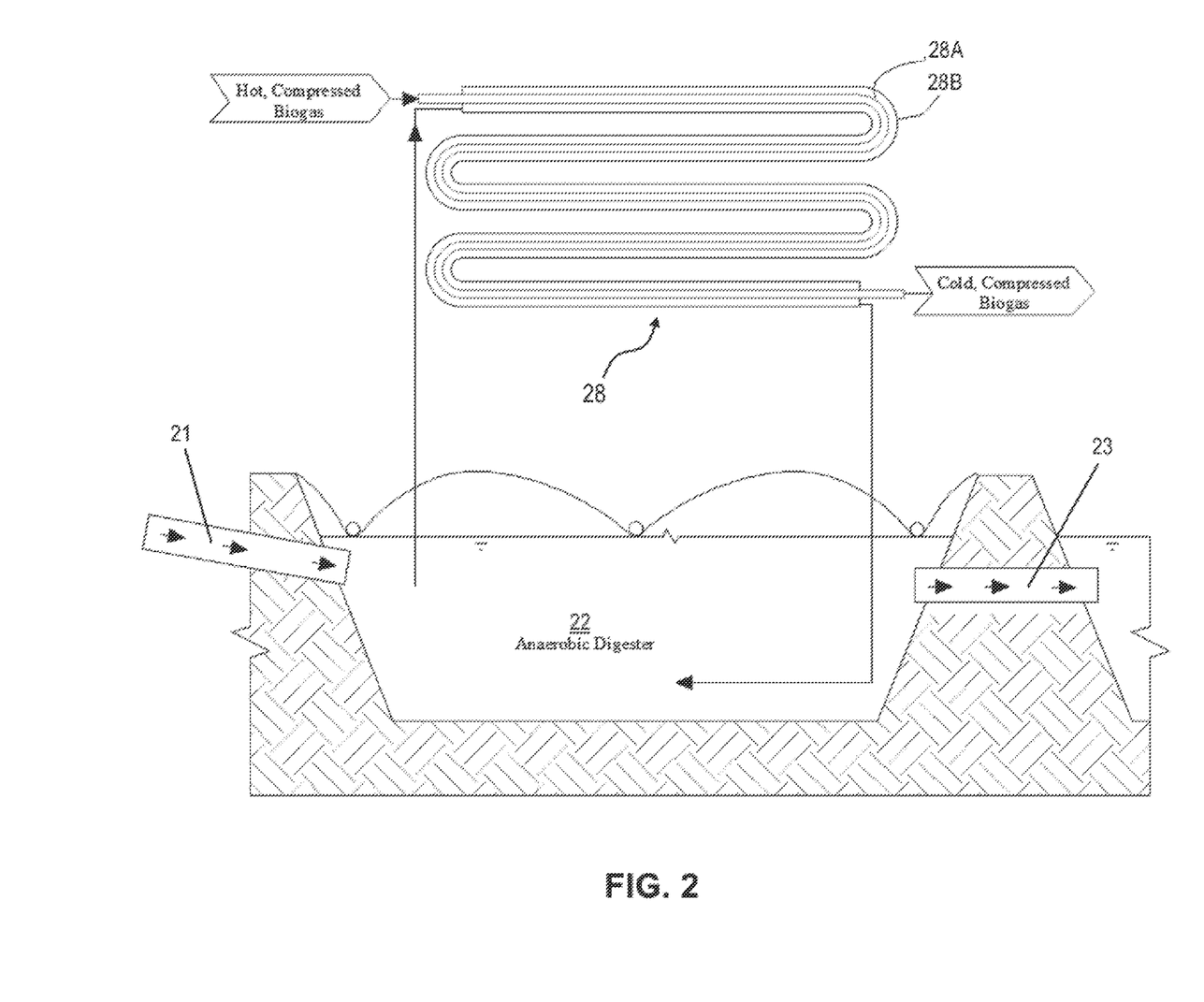
FIG. 2 depicts an exemplar digester and heat exchange system for use with the present system and method.

Turning now to FIG. 2, the anaerobic digester 22 is depicted receiving effluent from a CAFO via material conduit 21. When the anaerobic digester reaches a certain level, the effluent can proceed into the NAD bioreactor via overflow conduit 23. While the effluent is broken down, raw biogas can be generated and fed into a heat exchange loop 28 which can comprise an inner conduit 28A carrying primarily gas from the digester 22 jacketed by a thermally conductive outer conduit 28B carrying primarily liquid. This heat exchange loop 28 allows the compressed biogas to be cooled before conveying it to the biogas scrubber, depicted with more detail in FIG. 4, while simultaneously extracting the compressive heat energy of the loop to heat the digester influent, since digester efficiency increases at higher temperature. In an embodiment, this exchange can heat the anaerobic digester to about 90-105° F.

Turning now to FIG. 3, an embodiment of the NAD reactor component 24 is depicted in greater detail showing the three biochemical zones within the NAD bioreactor 24: an aerobic partial nitrification zone 24A where ammonia nitrogen is converted into nitrate by, e.g., *Nitrosomonas* and *Nitrobacter* bacteria; (2) anammox denitrification zone 24B located below the surface where ammoniacal nitrogen is directly converted into $N_2$ through the anaerobic oxidation of ammonium by, e.g., Planctomycetes bacteria; and (3) denitrification zone 24C near the surface where nitrogen oxides are converted to $N_2$ by various anoxic bacteria species including *Pseudomonas* and *Bacillus*.

Mechanically, the effluent can overflow from the anaerobic digester 22 via overflow conduit 23 which conveys the effluent into the NAD reactor cycle. The NAD reactor is kept cycling, for example, by means of a subsurface blower 25A which can create a bubble column within the partial nitrification zone 24A. The bubble column creates motive force allowing the fluid to cycle between the various stages of the NAl) bioreactor. After sufficient cycling, the cycled wastewater can be pumped from the nitrification zone 24A of the NAD bioreactor 24 via a conduit leading to pump 25B, which conveys the cycled wastewater (hereinafter "water" reflecting the lower methane and ammonia content) to the anammox filter 40.

Figure 4:
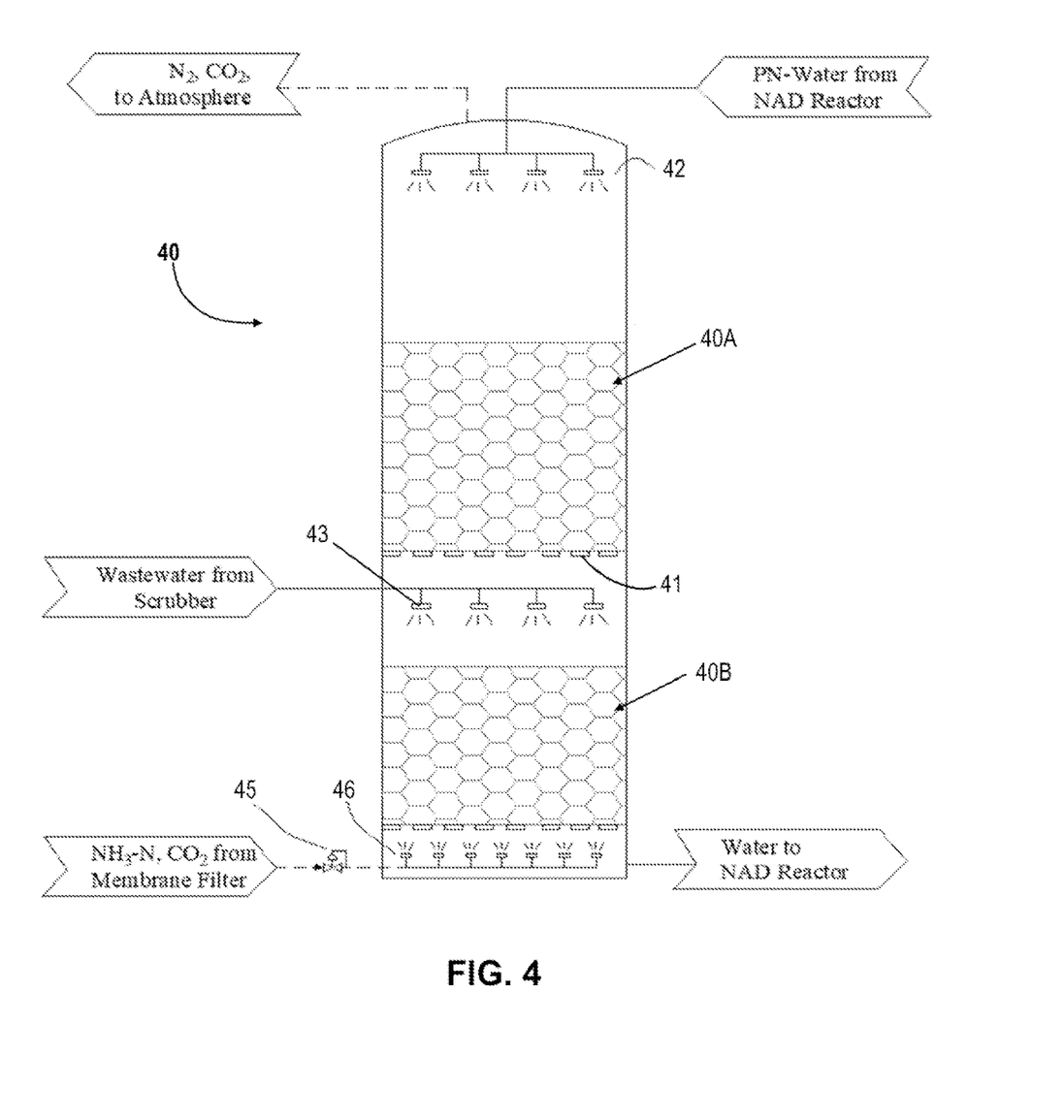
FIG. 4 depicts an embodiment of a novel anammox biofilter for use with the present system and method.

Turning now to FIG. 4, the anammox filter 40 is shown in greater detail. Anammox filter 40 is designed and operated to enhance growth of the Planctomycetes bacteria culture. The filter is packed with extruded plastic media to provide high surface-to-volume ratio and for the bacteria colonies to attach and grow on instead of being washed away by the sprinkling system. The packed column has two compartments 40A and 40B separated with perforated metal floor 41. Gaseous influent containing ammonia is introduced in the bottom compartment 40B such that, as the ammonia in the gas ascends the column into the top compartment 40A, it is converted biologically through the anammox process into $N_2$. Prior to introduction into the bottom compartment 40B, the gaseous influent can be decompressed via valve 45 controlling release into multiple blowers 46.

Meanwhile, liquid influent to the anammox filter 40, pulled from the NAD bioreactor 24 via pump 25B, is introduced in the top of the packed column 40A using feed distribution sprinklers 42. The water from NAD bioreactor 24 is partially nitrified and contains nitrites and nitrates which are used as oxidizing substrates in the anammox process to enzymatically convert ammoniacal nitrogen into $N_2$. As the water filters down through perforated metal floor 41, it is further diluted by water from the scrubber 30 introduced to bottom compartment 40B by means of scrubber water sprinklers 43. Once the water is biologically filtered through the anammox filter, it is returned back to the anammox zone of the NAD bioreactor 24 where oxidation of ammoniacal nitrogen to $N_2$ continues.

The separation of the anammox filter into top and bottom compartments 40A and 40B allows the scrubbing of ammonia gases, which rise due to their lighter density through the heavier water, which flows downwards. As the gas flows upward, the bacteria in the top half 40A will consume the ammonia before it is discharged into the atmosphere. Meanwhile, the ammonia in the NAD water entering the top has already been oxidized or hydrated, becoming dissolved nitrates which flow with the water downwards, where it is joined by more water with high ammonia concentration (as well as $H_2S$ and $CO_2$) for consumption by the bacteria in the bottom half 40B.

The removal and return of water to the NAD bioreactor 24 and the bubble filter create a hydraulic mixing action which automatically creates zones for anammox denitrification and anoxic zones for denitrification. After multiple cycles through the NAD bioreactor 24 and anammox filter 40, the wastewater is purified by reduction of ammoniacal nitrogen in favor of nitrates and nitrogen gas; water from the NAD bioreactor can then also be used to flush and wash the animal houses by means of recycled water conduit 34 which receives cleaned water from the NAD bioreactor 24. The recycled water has low ammonia concentration compared to covered lagoons with a standard digester system. This creates a healthier environment for the animals as well as human personnel working on the farm. Integration of the anammox filter reduces the cost of energy used by up to 60% compared to conventional nitrification and denitrification processes.

Figure 4A:
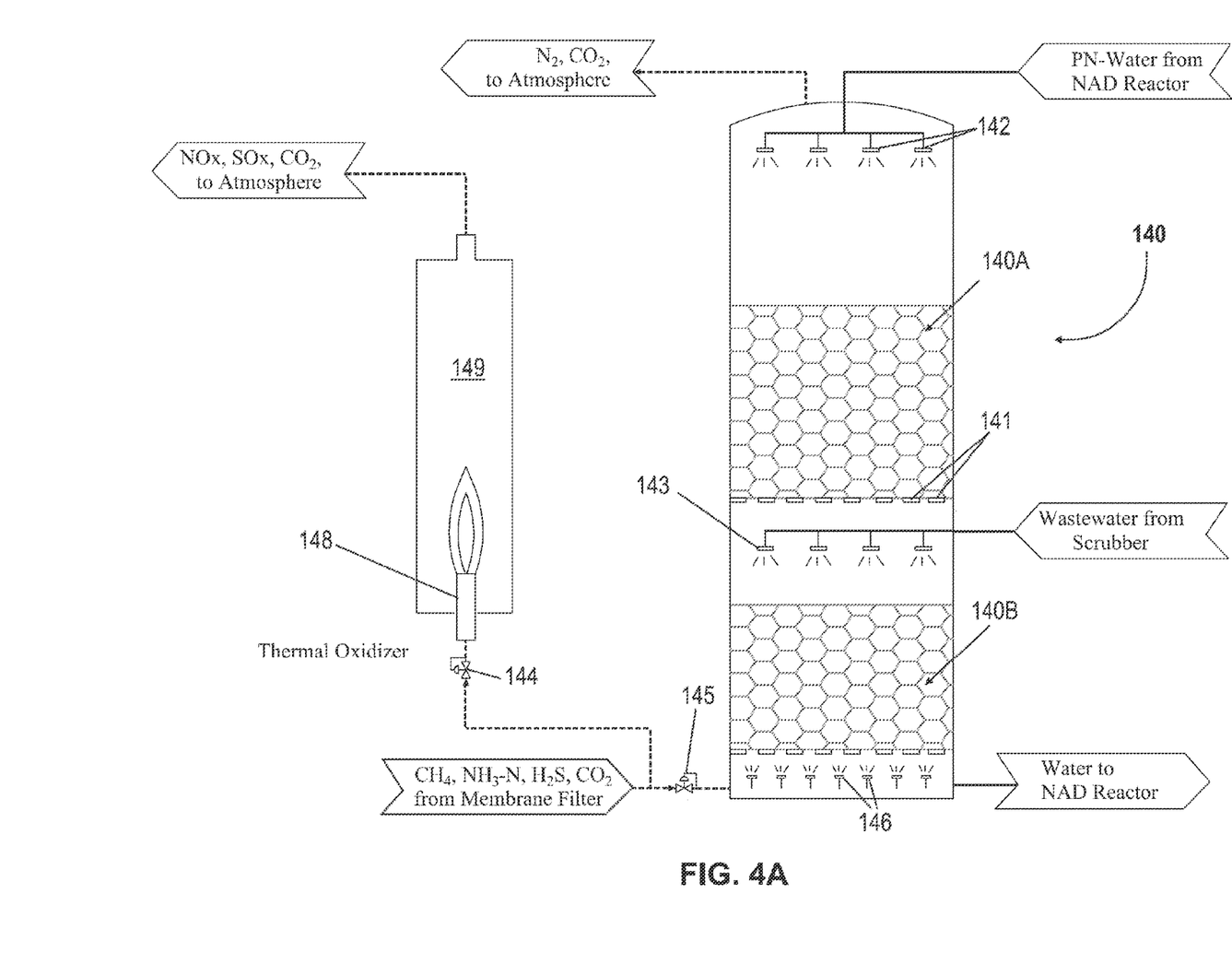
FIG. 4A depicts an alternate embodiment of the anammox biofilter comprising an auxiliary combustion chamber.

In an alternative embodiment of the anammox filter 140, shown in FIG. 4A, the internal components of the anammox filter 140 (top and bottom compartments 140A, 140B, sprinklers 142, 143, waste gas blowers 146, and perforated floor 141) are identical to the similarly-numbered components shown in the FIG. 4 embodiment of the anammox filter 40. However, in this embodiment, the valve 145, when closed, redirects the waste gases through a diversion valve 144 into a combustion chamber 149, where they may be fed through oxygen burner 148. This embodiment can be used, e.g., to relieve excess waste gas pressure in situations where the biological neutralization of the anammox filter is insufficient for throughput, or when the reactor is being configured for a situation in which low-emission operation is not required.

Figure 5:
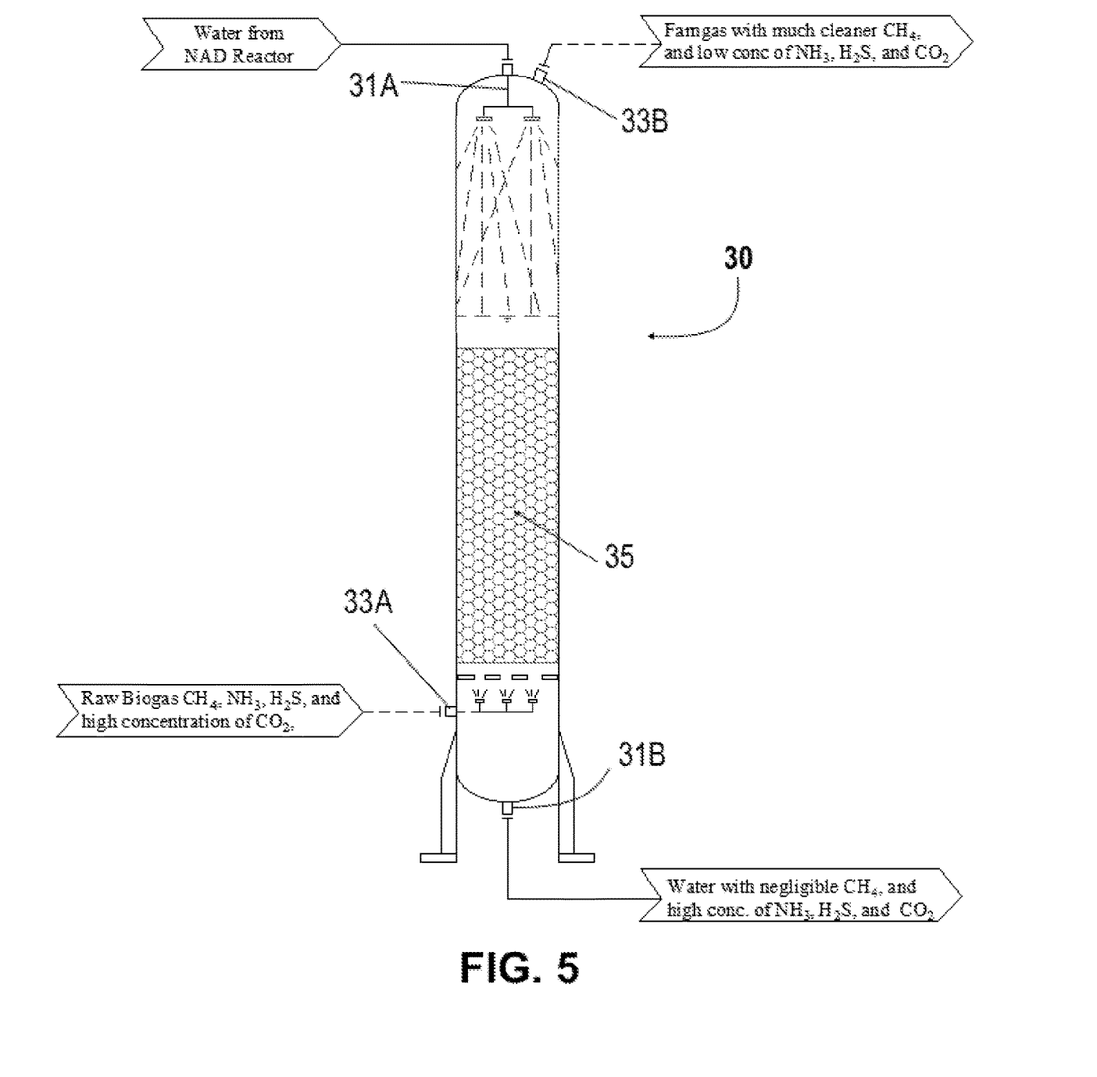
FIG. 5 depicts an embodiment of a scrubber for use with the present system and method.

Turning now to FIG. 5, an embodiment of a scrubber 30 is shown comprising water sprinklers 31A at the top, receiving water from the NAD bioreactor 24. As the water falls through the scrubber 30, the raw biogas emerging from the heat exchanger 28 is pumped up through the bottom of scrubber 30 via gas ingress 33A. The solubilities of gases in the biogas mix ($CO_2$, $CH_4$, $H_2S$, $NH_3$, etc.) are proportional to their partial pressures. The higher the pressure, the more the gasses are dissolved in the water. Therefore, the first step in the biogas cleaning process is compressing the biogas via compressor 26 (depicted in FIG. 1) to about 200-400 psi. As the compressed biogas is cooled, its solubility in water increases compared to when hot. Because the solubility of $CO_2$ in water is about 60 times higher than that of $CH_4$, most of the $CO_2$ in the biogas dissolves into the water in the scrubber and leaves through drain 31B, while $CH_4$ flows upward through the water mostly undissolved and leaves the scrubber 30 still in the gaseous phase via gas egress 33B. The scrubber 30 can contain the same plastic medium 35 as the anammox filter 40, however, in the scrubber it does not function a bacterial growth medium, but merely provides a high surface-to-volume ratio that increases the efficiency of mass transfer of the gasses into the liquid, thereby enhancing their solubilities.

Figure 6:
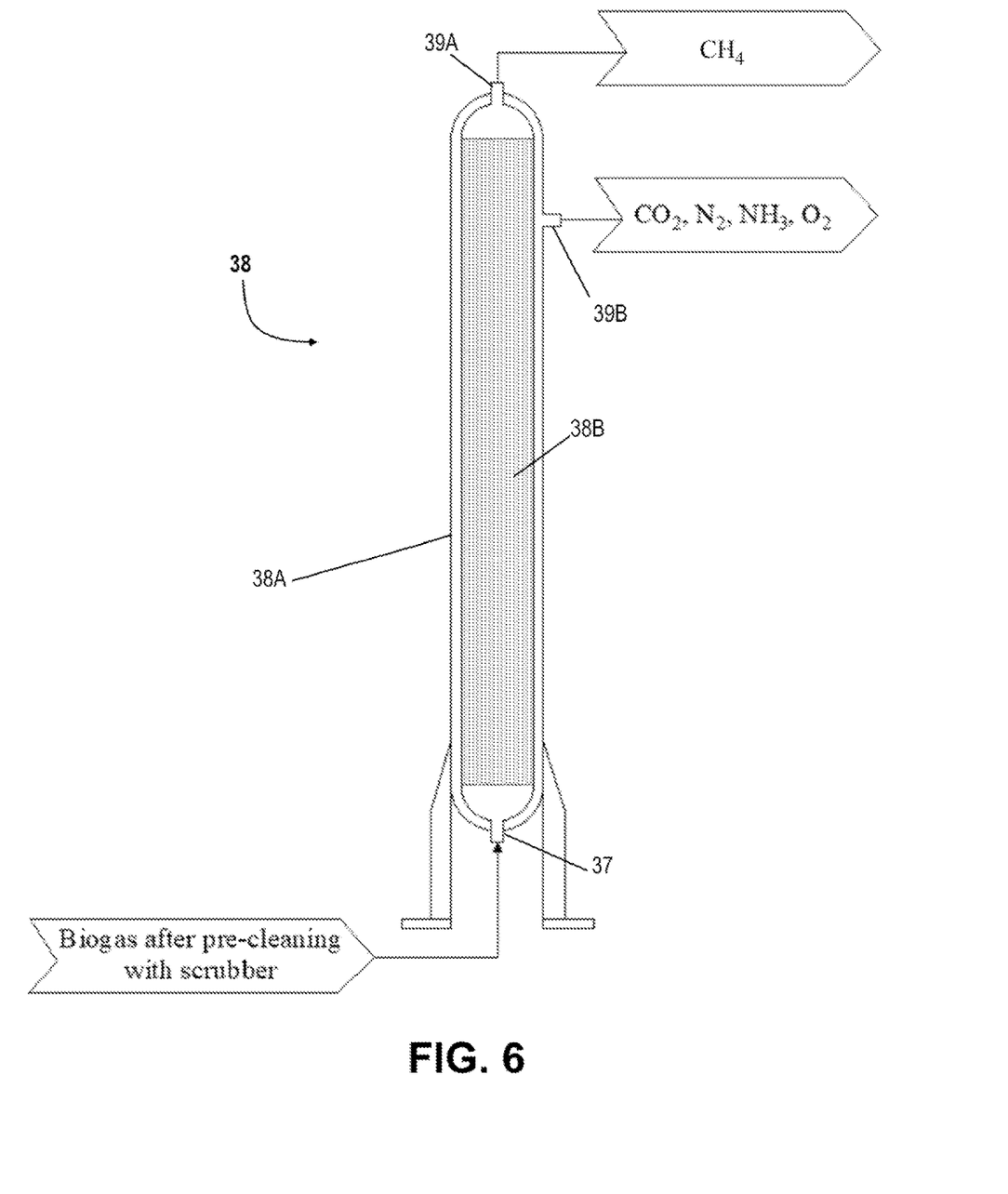
FIG. 6 depicts an embodiment of a membrane filter system for use with the present system and method.

Turning now to FIG. 6, an embodiment of a membrane filter 38 for further cleaning and upgrading the biogas is depicted receiving a biogas mixture from scrubber 30. The biogas is conveyed through a condenser 32 (depicted in FIG. 1) into an entry port 37 which exits at the bottom of a column of membranes 38B housed within a pressure chamber 38A. Due to molecular size and orientation, most of the remaining $CO_2$, as well as $H_2S$ and $NH_3$ are separated laterally by the membranes 38B and evacuated via filtrate port 39B to be returned to the anammox filter 40, while the $CH_4$ flows upward as upgraded Renewable Natural Gas (RNG) and can be extracted via the gas port 39A.

The membrane material 38B is similar to a typical micro filter, but with a molecular sieve wrapped around microtubules in an arrangement similar to the heat exchangers. The molecular pore size (between 0.5 and 2 microns) prevents 97-99% of methane from passing through at 200 psi while most of the other gases are vented through the sides of the microtubular membranes.

The RNG is further compressed as needed for distribution 50 (depicted in FIG. 1) in existing compressed natural gas pipeline or trucked to market using CNG tanker trucks.

While various embodiments usable within the scope of the present disclosure have been described with emphasis, it should be understood that within the scope of the appended claims, the present invention can be practiced other than as specifically described herein.

The invention claimed is:

1. A system for processing biogas from wastewater comprising:
   an anaerobic digester comprising a methanogenic bacterial culture, wherein the anaerobic digester receives wastewater comprising organic material, wherein the methanogenic bacterial culture converts a portion of the organic material to raw biogas comprising methane and waste gases;

a bioreactor receiving the wastewater from the anaerobic digester, wherein the bioreactor comprises a nitrification zone, an anammox zone, and a denitrification zone, wherein the wastewater is cycled through the zones of the bioreactor, purifying the wastewater by converting ammoniacal nitrogen into dissolved nitrate and nitrogen gas;

a scrubber comprising a bottom inlet and a top inlet, wherein the scrubber receives the raw biogas from the anaerobic digester pressurized through the bottom inlet, and water from the bioreactor through the top inlet, wherein the scrubber purifies the raw biogas by dissolving a portion of the waste gases into the water;

a biofilter comprising an anammox bacterial culture in a plastic medium, wherein the biofilter is divided into an upper stage and a lower stage by a perforated barrier, wherein the upper stage receives a flow of water containing dissolved nitrate from the bioreactor, wherein the lower stage receives water comprising dissolved waste gases from the scrubber, wherein the waste gases are decompressed and released into the lower stage of the biofilter, wherein ammonia rises through the perforated barrier and the flow of water from the upper stage, and wherein the ammonia and dissolved nitrate are further converted by the anammox bacterial culture into nitrogen gas.

2. The system of claim 1, further comprising:
a compressor receiving the raw biogas from the anaerobic digester, wherein the compressor pressurizes the raw biogas to at least 200 psi; and
a heat exchanger comprising an inner conduit receiving the pressurized raw biogas from the compressor and conveying it to the scrubber, and an outer conduit concentric to the inner conduit cycling wastewater to and from the anaerobic digester, wherein heat is transferred from the pressurized raw biogas within the inner conduit to the wastewater in the outer conduit.

3. The system of claim 2, further comprising a buffer tank between the compressor and the heat exchanger.

4. The system of claim 1, further comprising:
a condensor receiving the purified biogas from the scrubber; and
a membrane filter receiving condensed, purified biogas from the condensor, wherein the membrane filter comprises a microtubular sieve for further purifying the biogas into methane, wherein remaining waste gases filtered by the microtubular sieve are laterally emitted from the microtubular sieve into a waste gas line.

5. The system of claim 4, wherein the waste gas line comprises a diversion valve, wherein the diversion valve selectively redirects the remaining waste gases to a combustion chamber or the lower stage of the biofilter.

6. The system of claim 4, wherein the membrane filter is housed in a pressure chamber for maintaining the purified biogas received from the scrubber at a pressure of at least 200 psi.

7. The system of claim 1, wherein the nitrification zone of the bioreactor comprises an aerobic bacterial culture, wherein the anammox zone of the bioreactor comprises an anammox bacterial culture, and wherein the denitrification zone of the bioreactor comprises an anaerobic bacterial culture.

8. The system of claim 7, wherein the nitrification zone of the bioreactor comprises a subsurface gas pump, wherein the subsurface gas pump introduces air into the water and creates a bubble column, wherein the bubble column provides motive force for cycling the water through the zones of the bioreactor.

9. The system of claim 1, wherein the upper stage of the biofilter comprises an upper sprinkler feed for misting the water from the bioreactor, and the lower stage of the biofilter comprises a lower sprinkler feed for misting the water from the scrubber.

10. The system of claim 1, wherein water from the bioreactor is cycled back into a wastewater source for cleaning.

11. A method for extracting and refining biogas from wastewater comprising:
conveying the wastewater from a wastewater source to an anaerobic digester comprising a methanogenic bacterial culture, wherein the methanogenic bacterial culture converts a portion of the wastewater into raw biogas;
cycling remaining wastewater into a bioreactor, wherein the bioreactor purifies the remaining wastewater by subjecting it to an aerobic nitrification zone, an anammox denitrification zone, and an anoxic denitrification zone, converting ammoniacal nitrogen to dissolved nitrates and nitrogen gas;
pressurizing the raw biogas from the anaerobic digester, conveying the pressurized raw biogas to a scrubber, and conveying water from the bioreactor to the scrubber, wherein waste gases within the raw biogas preferentially dissolve into the water;
draining the water containing the dissolved waste gases from the scrubber into an anammox filter, wherein the water is depressurized and the waste gases outgassed, and an ammonia portion of the waste gases is converted to nitrogen gas; and
conveying the water containing dissolved nitrates from the bioreactor to the anammox filter, wherein the dissolved nitrate is converted to nitrogen gas.

12. The method of claim 11, wherein the step of pressurizing the raw biogas from the anaerobic digester further comprises:
compressing the raw biogas to at least 200 psi; and
feeding the compressed biogas through a heat exchanger, wherein the compressed biogas is surrounded by wastewater cycled from the anaerobic digester and transfers a portion of its heat energy thereto.

13. The method of claim 12, wherein the step of compressing the raw biogas further comprises storing the raw biogas within a buffer tank prior to feeding the raw biogas through a heat exchanger.

14. The method of claim 11, further comprising the step of conveying the scrubbed biogas from the scrubber through a condenser and into a membrane filter within a pressure vessel, wherein the membrane filter further removes waste gases from the scrubbed biogas.

15. The method of claim 14, further comprising conveying the filtered waste gases from the membrane filter to the anammox filter.

16. The method of claim 14, wherein the pressure vessel housing the membrane filter maintains the biogas at a pressure of at least 200 psi.

17. The method of claim 11, wherein the step of cycling the remaining wastewater through the bioreactor comprises creating a bubble column within the aerobic nitrification zone of the bioreactor by means of a subsurface gas pump, wherein the subsurface gas pump introduces air into the water and creates a bubble column, wherein the bubble column provides oxygen and motive force for cycling the water through the zones of the bioreactor.

18. The method of claim 17, wherein the aerobic nitrification zone of the bioreactor comprises an aerobic bacterial culture, wherein the anammox denitrification zone of the bioreactor comprises an anammox bacterial culture, and wherein the anoxic denitrification zone of the bioreactor comprises an anaerobic bacterial culture.

19. The method of claim 11, wherein the step of conveying the water containing the dissolved waste gases from the scrubber into the anammox filter comprises misting the water through a sprinkler feed to facilitate depressurization and outgassing.

20. The method of claim 11, further comprising the step of returning water from the bioreactor back into the wastewater source for cleaning subsequent to the cycling.

* * * * *